(12) United States Patent
Ioannidis et al.

(10) Patent No.: US 12,564,284 B2
(45) Date of Patent: Mar. 3, 2026

(54) POD STABILIZER FOR BEVERAGE MACHINE

(71) Applicant: Keurig Green Mountain, Inc., Burlington, MA (US)

(72) Inventors: Nicholas George Ioannidis, Tewksbury, MA (US); Robert Dana Cassano, Natick, MA (US); Kevin Scott Stillerman, Medford, MA (US)

(73) Assignee: Keurig Green Mountain, Inc., Burlington, MA (US)

( * ) Notice: Subject to any disclaimer, the term of this patent is extended or adjusted under 35 U.S.C. 154(b) by 992 days.

(21) Appl. No.: 17/640,280

(22) PCT Filed: Sep. 22, 2020

(86) PCT No.: PCT/US2020/051987
§ 371 (c)(1),
(2) Date: Mar. 3, 2022

(87) PCT Pub. No.: WO2021/061639
PCT Pub. Date: Apr. 1, 2021

(65) Prior Publication Data
US 2022/0338668 A1 Oct. 27, 2022

Related U.S. Application Data

(60) Provisional application No. 62/905,467, filed on Sep. 25, 2019.

(51) Int. Cl.
*A47J 31/44* (2006.01)
*A47J 31/36* (2006.01)
*A47J 31/40* (2006.01)

(52) U.S. Cl.
CPC ....... *A47J 31/4492* (2013.01); *A47J 31/3628* (2013.01); *A47J 31/3695* (2013.01); *A47J 31/407* (2013.01); *A47J 31/3633* (2013.01)

(58) Field of Classification Search
CPC ................ A47J 31/4492; A47J 31/3628; A47J 31/3623; A47J 31/3633; A47J 31/3676;
(Continued)

(56) References Cited

U.S. PATENT DOCUMENTS

| | | | |
|---|---|---|---|
| 3,511,166 A | 5/1970 | Bixby | |
| 3,958,502 A | 5/1976 | Vitous | |

(Continued)

FOREIGN PATENT DOCUMENTS

| | | |
|---|---|---|
| CN | 102791170 A | 11/2012 |
| CN | 102958406 A | 3/2013 |

(Continued)

OTHER PUBLICATIONS

International Search Report and Written Opinion mailed Dec. 1, 2020, in connection with International Application No. PCT/US2020/051987.

(Continued)

*Primary Examiner* — Reginald Alexander
(74) *Attorney, Agent, or Firm* — Wolf, Greenfield & Sacks, P.C.

(57) ABSTRACT
A beverage machine and method in which a pod is positioned relative to a camera as a brew chamber moves to a closed position so the pod can be imaged prior to brew chamber closure. A pod stabilizer may urge a pod to be received by a pod receiver of the brew chamber before the brew chamber is closed and so as to properly position the pod for imaging.

20 Claims, 6 Drawing Sheets

(58) Field of Classification Search
CPC ... A47J 31/3696; A47J 31/407; A47J 31/3695
USPC ............................................................. 99/295
See application file for complete search history.

(56) References Cited

U.S. PATENT DOCUMENTS

| | | | |
|---|---|---|---|
| 4,263,498 A | 4/1981 | Meyers | |
| 4,602,145 A | 7/1986 | Roberts | |
| 7,398,726 B2 | 7/2008 | Streeter et al. | |
| 8,037,811 B2 | 10/2011 | Bunn | |
| 2008/0092746 A1 | 4/2008 | Clark et al. | |
| 2008/0134902 A1 | 6/2008 | Zimmerman et al. | |
| 2009/0120299 A1 | 5/2009 | Rahn et al. | |
| 2015/0201790 A1* | 7/2015 | Smith | A47J 31/3695 |
| | | | 426/431 |
| 2016/0051080 A1 | 2/2016 | Lo Faro et al. | |

FOREIGN PATENT DOCUMENTS

| | | | |
|---|---|---|---|
| CN | 105813513 A | 7/2016 | |
| CN | 106163347 A | 11/2016 | |
| DE | 10 2007 032287 A1 | 1/2009 | |
| EP | 0151252 A1 * | 12/1984 | .......... A47J 31/3676 |
| GB | 2397503 A * | 7/2004 | .......... A47J 31/0673 |
| WO | WO 2009/007292 A1 | 1/2009 | |
| WO | WO 2015/004552 A1 | 1/2015 | |
| WO | WO-2015091301 A1 * | 6/2015 | .......... A47J 31/3676 |
| WO | WO-2017132452 A2 * | 8/2017 | .......... A47J 31/4492 |

OTHER PUBLICATIONS

International Preliminary Report on Patentability mailed Mar. 15, 2022, in connection with International Application No. PCT/US2020/051987.

PCT/US2020/051987, Dec. 1, 2020, International Search Report and Written Opinion.

PCT/US2020/051987, Mar. 15, 2022, International Preliminary Report on Patentability.

* cited by examiner

POD STABILIZER FOR BEVERAGE MACHINE

CROSS REFERENCE TO RELATED APPLICATION

This application is a national stage filing under 35 U.S.C. § 371 of International Patent Application No. PCT/US2020/051987, filed Sep. 22, 2020, which claims the benefit of U.S. Provisional Application No. 62/905,467, filed Sep. 25, 2019. The contents of these applications are hereby incorporated by reference in their entireties.

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Patent Application publication 2008/0134902 discloses a beverage forming system that heats water in a reservoir and pneumatically delivers the heated water to a brew chamber for making a coffee drink or other beverage. U.S. Pat. No. 7,398,726 discloses another beverage forming system that delivers heated water from a dispensing tank to a brew chamber by pneumatic forcing of the water from the metering tank. U.S. Patent Application publications 2009/0120299 and 2008/0092746, and U.S. Pat. Nos. 3,511,166, 3,958,502, 4,602,145, 4,263,498 and 8,037,811 disclose other system types in which water in a heater tank or heat exchanger is forced to flow out of the tank and to a beverage making station by introducing unheated water into the tank/exchanger.

SUMMARY OF INVENTION

In one aspect, a beverage machine includes a liquid supply arranged to provide a liquid for forming a beverage, and a brew chamber movable between open and closed positions and arranged to hold a pod containing beverage material for mixing with the liquid to form a beverage. A liquid conditioner may be arranged to heat or cool the liquid that is provided to the brew chamber and used to form a beverage using the pod, and housing may be arranged to support at least portions of the liquid supply, brew chamber and liquid conditioner. The brew chamber may include a camera or other sensor arranged to image a portion of a lid of the pod prior to closure of the brew chamber, e.g., so the machine can identify a characteristic of the pod, such as a beverage type, manufacturer, authentication information, brew parameters to be used to make a beverage using the pod, etc. A pod stabilizer may be arranged to contact and hold the pod prior to closure of the brew chamber for imaging by the camera. Thus, the pod stabilizer may help ensure that the pod is suitably positioned for imaging, e.g., in case the pod is not properly received into the brew chamber such as where the brew chamber is designed to not fully receive the pod until the brew chamber is fully closed.

In one embodiment, the brew chamber is adapted to receive the pod having a cup-shaped container and the lid is secured to an opening of the cup-shaped container. The lid may be flat, and may bear indicia such as text, a logo, a barcode or other machine readable information, etc. The brew chamber may include a pod receiver having a recess to receive the cup-shaped container and a cover, with the receiver and cover being movable relative to each other between the open and closed positions such that in the open position the receiver is exposed to receive the pod and in the closed position the cover and the receiver at least partially enclose the pod. The camera or other sensor may be mounted to and movable with the cover, and arranged to image the lid of the pod as the cover moves toward the closed position. The pod stabilizer may be arranged to contact a part of the lid and urge the pod into the recess of the receiver as the receiver and cover are moved toward the closed position. In some cases, the pod stabilizer may contact a part of the lid that is not imaged by the camera, allowing the camera to image the lid while the pod stabilizer is in contact with the lid. For example, the pod stabilizer may be arranged to contact the lid only at a rear side of the receiver (e.g., at a rim of the pod) and the camera may be arranged to image at least a center area of the lid. In other arrangements, the pod stabilizer may contact the pod to suitably position the pod for imaging, and then may retract or otherwise move out of contact with the pod. In some embodiments, the pod stabilizer is arranged to push the pod into the recess as the receiver and cover are moved toward the closed position such that the pod is fully seated in the receiver prior to the receiver and cover reaching the closed position. Alternately, the pod stabilizer may urge the pod into the recess, but not push the pod fully into the recess. In some embodiments, the camera is arranged to image the pod after the pod is fully seated in the receiver and before the receiver and cover reach the closed position.

The pod stabilizer may be arranged in different ways, and may be moveable with or relative to various parts of a brew chamber. For example, as noted above the brew chamber may include a receiver to receive the pod and a cover, with the receiver and cover being movable relative to each other between the open and closed positions. The pod stabilizer may be movable relative to both the receiver and the cover, or only movable relative to the receiver or cover. In some cases, movement of the receiver and cover relative to each other causes movement of the pod stabilizer, while in other cases the stabilizer may be moved by a separate drive such as a motor and linkage that operates to move only the stabilizer.

In another aspect, a method of operating a beverage machine adapted to use a pod to form a beverage includes receiving the pod in a brew chamber with the brew chamber in an open position, and moving the brew chamber toward a closed position in which the pod is at least partially enclosed and used to form a beverage. A lid of the pod may be contacted and the pod held in a position suitable for imaging the lid of the pod as the brew chamber moves toward the closed position. The lid of the pod may be imaged as the brew chamber moves toward the closed position and while the pod is held in the position suitable for imaging, e.g., before the brew chamber reaches the closed position. In some cases, contacting the lid includes urging the pod into a recess of a receiver of the brew chamber, e.g., so the pod is fully received into the receiver. In some embodiments, moving the brew chamber includes moving a cover and a receiver of the brew chamber relative to each toward the closed position such that the cover is positioned over a recess of the receiver adapted to receive the pod, and imaging includes imaging the lid using a camera mounted to the cover.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention. Thus, features in one embodiment may be used in other embodiments that do not illustrate that particular feature absent some reason the combination could not be made.

Figure 1:
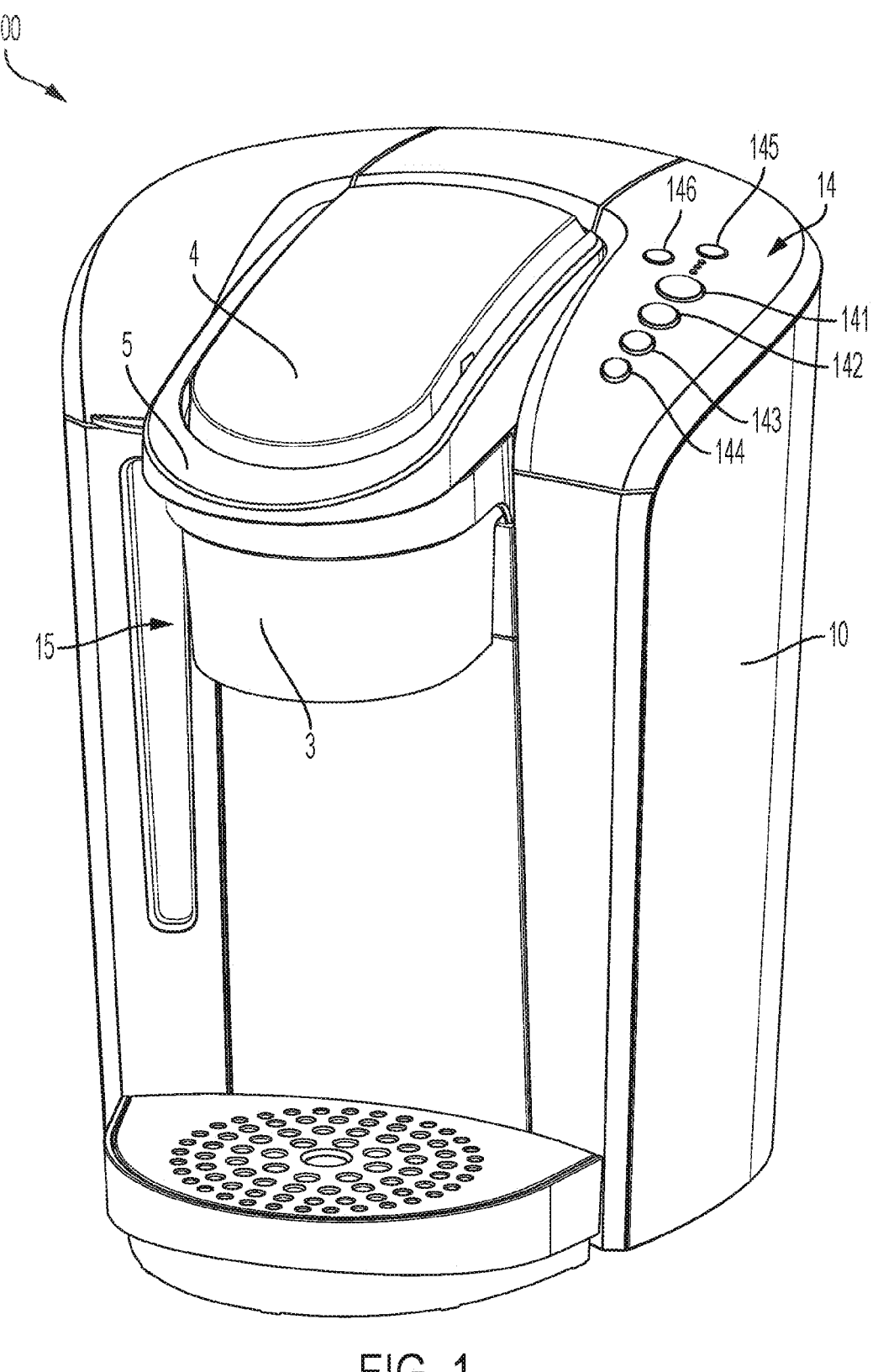
FIG. 1 is a right side perspective view of a beverage forming system in an illustrative embodiment.
Figure 2:
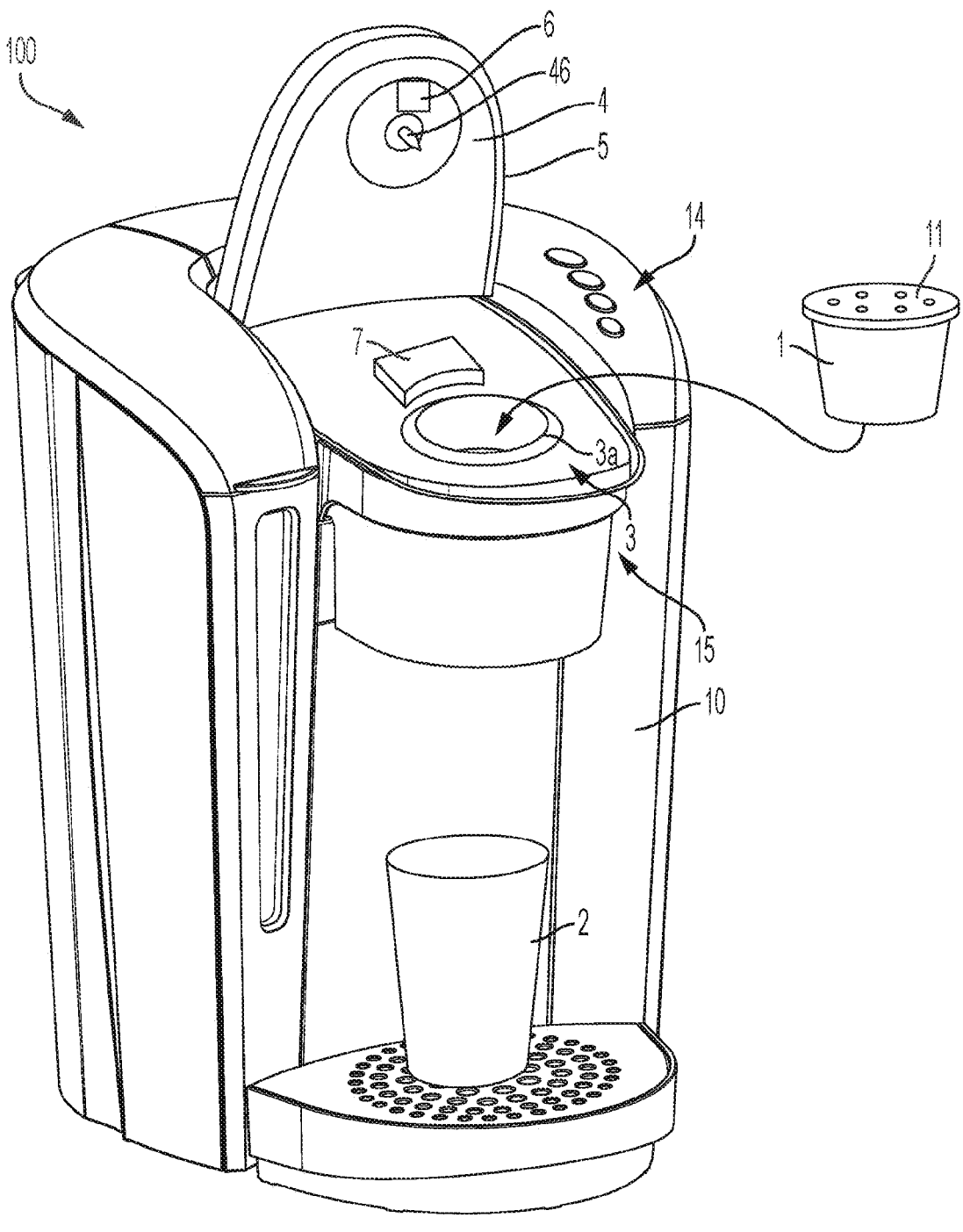
FIG. 2 is a left side perspective view of the beverage forming system with a brew chamber in an open position.

FIGS. 1 and 2 show perspective views of a beverage machine 100. Although the beverage machine 100 may be used to form any suitable beverage, such as tea, coffee, other infusion-type beverages, beverages formed from a liquid or powdered concentrate, soups, juices or other beverages made from dried materials, or other, in this illustrative embodiment, the machine 100 is arranged to form coffee or tea beverages. As is known in the art, a beverage pod 1 (also referred to as a cartridge herein) may be provided to the machine 100 and used to form a beverage that is deposited into a user's cup or other suitable container 2. The pod 1 may be manually or automatically placed in a brew chamber 15 that includes a pod receiver 3 and cover 4. For example, the receiver 3 may be or include a cup-shaped recess 3a or otherwise be suitably to receive the pod 1. With a pod 1 placed in the pod receiver 3, a handle 5 may be moved by hand (e.g., downwardly) so as to move the cover 4 to a closed position (as shown in FIG. 1). In the closed position, the cover 4 at least partially covers the recess 3a, e.g., to at least partially enclose the pod 1 in a space in which the pod is used to make a beverage. For example, with the pod 1 held by the pod receiver 3 in the closed position, water or other liquid may be provided to the pod 1 (e.g., by injecting the liquid into the pod interior) to form a beverage that exits the pod 1 and is provided to a cup 2 or other container. Of course, aspects of the invention may be employed with any suitably arranged machine 100, including drip-type coffee brewers, carbonated beverage machines, and other systems that deliver water or other liquid to form a beverage. Thus, the brew chamber 15 need not necessarily include a pod receiver 3 and a cover 4 arranged to move relative to a housing 10 of the machine to open and close the brew chamber. For example, the cover 4 may be fixed in place relative to the housing 10 and the receiver 3 may move, or both the cover 4 and the receiver 3 may move relative to the housing 10. In other embodiments, the brew chamber 15 need not be user accessible, but instead a pod 1 may be automatically provided to, and removed from, the brew chamber. Also, while in this embodiment the receiver 3 and cover 4 move pivotally relative to each other, other types of motion are possible, such as linear movement, movement along an irregular path, etc. Accordingly, a wide variety of different types and configurations for a brew chamber may be employed with aspects of the invention.

In accordance with an aspect of the invention, the beverage machine may include a camera or other sensor 6 arranged to image a portion of a pod 1 held by the pod receiver 3. For example, in this embodiment, a camera 6 is attached to the cover 4 for movement with the cover 4 between open and closed positions. The camera 6 is arranged to image a lid 11 of the pod 1 in the pod receiver 3, which image may include an alphanumeric string, a barcode, text, logo and/or other machine readable feature on the pod 1. The image data captured by the camera 6 could represent any of a variety of different pieces of information, such as a type of beverage to be made using the pod, a manufacturer or brand name of the pod, an expiration date or date the pod was manufactured, brew parameters or other instructions for using the pod to form a beverage, authentication or authorization information that allows the beverage machine to use the pod, and/or other information. A machine readable feature can be arranged in different ways, such as a visible alphanumeric text string, barcode, a security ink pattern, graphics, and others.

In accordance with an aspect of the invention, the pod may be positioned in the brew chamber for imaging prior to closure of the brew chamber, i.e., before the brew chamber reaches the closed position. This may help ensure that the pod is suitably imaged, e.g., that an appropriate portion of the pod is within a field of view of a camera, that the pod is oriented so the camera can properly view and focus on desired information, etc. Positioning of the pod for imaging may be desirable for various reasons, such as with brew chamber arrangements in which a pod is not necessarily always positioned in the same way when initially received into the brew chamber. For example, in some cases, a pod will be pierced by an outlet needle or other piercing element to allow beverage to exit the pod. The piercing element may be located in a receiver 3 of the brew chamber 15, and the pod 1 may have to be forced downwardly on the piercing element to cause the pod to be pierced. Some beverage machines of this type rely on closure of the brew chamber to force the pod into suitable contact with the piercing element(s), e.g., when a receiver 3 and cover 4 move together at the closed position, the pod is forced into contact with the piercing element(s). Since a pod may not be pierced by a piercing element when the pod is initially placed in a brew chamber receiver 3, the pod may not be fully received into the receiver 3 and/or the pod may be positioned in any one of different orientations. As a result, the lid of the pod may be positioned in various orientations, including orientations that are at an angle with respect to the lid 11 position when the pod 1 is fully seated in the receiver 3. For example, the lid 11 may be oriented in a horizontal plane when the pod is fully received in the receiver 3, but is oriented in one or more planes at an angle to the horizontal plane if the pod is not fully received in the receiver 3. A pod 1 may not be fully received in a receiver 3 for other reasons than not being pierced by a piercing element, such as careless placement by a user, friction between the pod and receiver, etc. In any case, the lid 11 of the pod 1 may not be ideally or otherwise suitably positioned to be imaged by a camera, at least when the pod is initially received by the brew chamber.

In some embodiments, a pod may be suitably positioned for imaging by a pod stabilizer 7 that contacts the pod and holds the pod so that the lid can be properly imaged prior to closure of the brew chamber. For example, the stabilizer 7 may be arranged so that when the brew chamber 15 is in the open position (e.g., with the cover 4 positioned away from the receiver 3), a user can place a pod 1 in the receiver 3 without interference by the stabilizer 7. With movement of the brew chamber 15 toward the closed position, the stabilizer 7 may move to contact the pod 1 and orient the pod as desired. The pod stabilizer 7 may act in different ways to position the pod, e.g., by urging the pod to be received into the recess 3a of the receiver 3. This may cause the pod to be pierced by a piercing element in the receiver 3, if present, or otherwise cause the pod to be properly received into the receiver 3. In some cases, the pod stabilizer 7 may contact the pod 1 at a portion of the lid 11, e.g., the stabilizer may contact the lid 11 to exert a force on the lid 11 that tends to cause the lid 11 to orient itself in a plane of the stabilizer. This action by the stabilizer 7 may not cause the pod to be fully received into the receiver 3 and/or to be pierced by a piercing element, but instead may orient the pod in a desired way. In some cases, the stabilizer may contact the pod 1 at a rim, e.g., at a portion of the lid 11 where the lid is secured to a rim or flange of a cup-shaped container of the pod 1. This may help the stabilizer 7 properly position the pod 1 for imaging, as well as keep the stabilizer away from areas of the lid 11 that are imaged by the camera 6. Thus, the stabilizer may maintain contact with the pod in some embodiments while the pod is imaged, while in other embodiments the stabilizer may position the pod and then retract or otherwise move out of contact with the pod for imaging.

Figure 3:
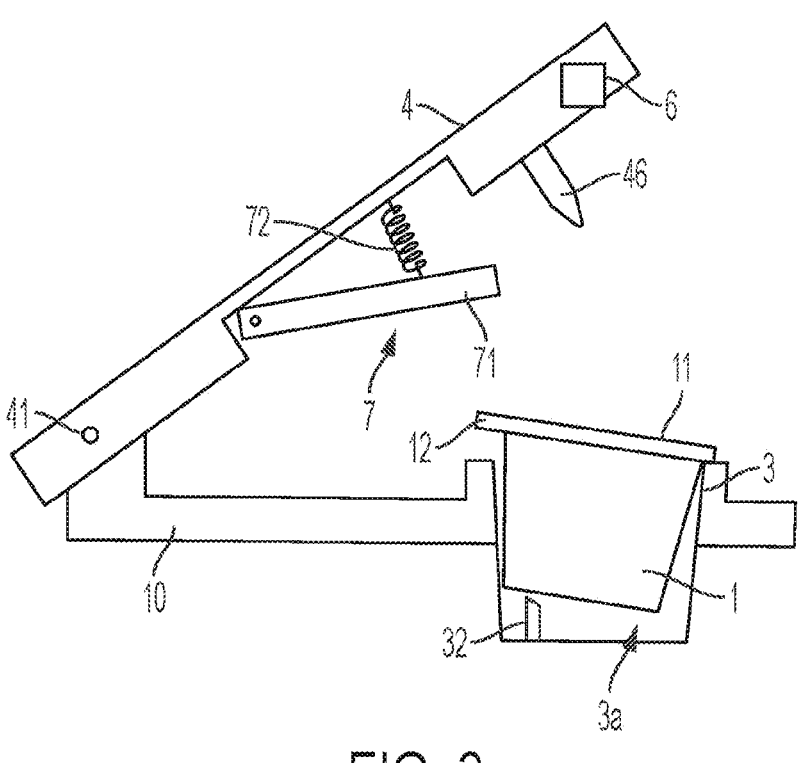
FIG. 3 is a schematic diagram of a brew chamber of the beverage forming system having a pod stabilizer in an illustrative embodiment.

FIG. 3 shows an illustrative embodiment of a stabilizer for use in a beverage machine arranged like that in FIGS. 1 and 2. In this embodiment, the stabilizer 7 is arranged to contact the lid 11 of the pod 1 at a rear side of the receiver 3 as the brew chamber is moved toward the closed position. For example, as the cover 4 is moved toward the closed position, the stabilizer 7 may contact the lid 11 at a rim of the pod 1 where the lid 11 is secured to the rim or flange 12 of the cup-shaped container of the pod 1. This part of the pod 1 may be stiffer than other parts of the pod 1, and so may be more effective in helping to position the pod 1 in the receiver 3. For example, the lid 11 may be made of relatively thin sheet material, e.g., a thin laminate of metal foil and polymer. The rim 12 may be made thicker, and together with an adhesive used to secure the lid 11 and the lid 11 material itself, the rim 12 area of the pod may have more stiffness than the lid 11 or other portions of the pod 1. The stabilizer 7 may therefore contact this area of the pod 1 to influence its position relative to the camera 6 and/or the receiver 3. However, the stabilizer 7 may contact other areas of the pod than at the rim 12. Contact of the stabilizer 7 with the pod 1 may cause the pod to be received into the receiver 3 or may position the pod without causing the pod to further received into the receiver 3. For example, the stabilizer 7 may press downwardly on the rim 12 to urge the pod 1 into the recess 3a of the receiver 3. This urging may cause the pod 1 to be fully received into or seated in the receiver 3, in some cases causing the pod 1 to be pierced by a piercing element 32, such as an outlet needle. Alternately, or in addition, the stabilizer 7 may contact the pod 1 to help orient the lid 11 suitably with respect to the camera 6, e.g., to orient the lid 11 in a horizontal plane or other orientation that is suitable for imaging, without piercing the pod and/or causing the pod to be further received into the brew chamber. As an example, contact of the stabilizer 7 may orient the lid 11 in a plane of a portion of the stabilizer 7 that contacts the pod 1, whether in the horizontal plane or some other orientation.

In the embodiment of FIG. 3, the stabilizer 7 includes an arm 71 that is pivotally mounted at a proximal end to the cover 4 and is biased by a spring 72 to pivot downwardly relative to the cover 4. When the cover 4 is in an open position, e.g., pivoted upwardly and away from the receiver 3 about a pivot axis 41, the receiver 3 may be exposed to receive a pod 1 into the recess 3a. The stabilizer 7 may be positioned away from the receiver 3 as well, easing reception of the pod 1 into the receiver 3. As the cover 4 is pivoted downwardly about the pivot axis 41 toward the closed position, the distal end of the arm 71 contacts the lid 11 of the pod to help orient the pod 1 for imaging by the camera 6. The spring 72 may bias the arm 71 into contact with the pod 1, thereby helping to orient the lid 11 with respect to the arm 71 and/or the receiver 3. In FIG. 3, the pod 1 is shown in contact with an exit piercing element 32, which props the pod 1 up at a bottom, rear portion of the pod 1. As a result, the pod 1 is tilted forwardly so that the lid 11 of the pod is in a plane that is tilted forwardly as well. In some cases, the lid 11 may also be tilted to the side, e.g., a plane of the lid 11 may be tilted forwardly as shown and in a direction into or out of the plane of FIG. 3. Contact of the arm 71 with the pod 1 may urge the pod in a direction toward full reception of the pod 1 into the recess 3a, and this urging may suitably orient the pod for imaging. In some cases, the pod may be urged downwardly so that the pod is pierced by the piercing element 32 and the pod is fully received into the receiver 3. This may orient the lid 11 in a horizontal plane or other plane that is parallel to plane in which the pod is fully received in the receiver 3. Alternately, the urging by the stabilizer 7 may not cause piercing of the pod, but still orient the pod relative to the stabilizer 7 in a way suitable for imaging by the camera 6. For example, the pod 1 may remain propped up by the outlet piercing element 32 as in FIG. 3, but the plane of the lid may be tilted rearwardly (e.g., to a more horizontal orientation) and/or tilted to the side. The camera 6 may image the lid 11 before the cover 4 (and thus the brew chamber 15) reaches the closed position, and imaging may occur with the pod fully seated in the receiver 3 or before the pod is fully seated. Imaging the pod prior to brew chamber closure may provide various advantages, such as possibly enabling the camera 6 to use ambient light for image capture, allowing the beverage machine controller to receive information from the camera 6 regarding the pod as quickly as possible so the controller can provide suitable brew options to a user, allowing the camera to image the pod before portions of the cover or other machine parts obscure or damage parts of the lid, etc. Piercing of the pod by the piercing element 32, as well as by the piercing element 46, may occur with contact of the cover 4 with the pod 1, which forces the pod into the receiver 3. If desired, the stabilizer arm 71 may be received into a recess of the cover 4 when the cover 4 is at the closed position.

Figure 4:
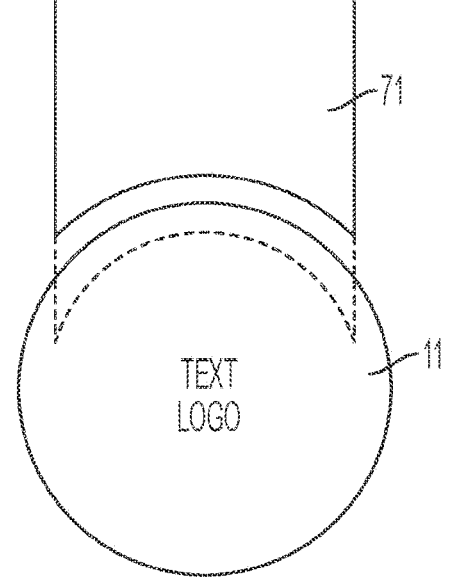
FIG. 4 shows a top view of a pod stabilizer in the FIG. 3 embodiment.

As noted above, the camera 6 may be arranged to image a center area of the lid 11, away from the rim 12, or at least away from areas where the stabilizer 7 contacts the lid 11. As a result, the camera 6 can capture one or more images of the lid 11 since most of the area of the lid 11 is not covered or obscured by the stabilizer 7. For example, FIG. 4 shows a top view of the stabilizer arm 71 and lid 11 in the FIG. 3 embodiment. The arm 71 is arranged to move to contact the lid 11 at a rear area of the receiver 3, and thus a rear area of the pod in relation to its orientation in the receiver 3. The contact area between the arm 71 and the lid 11 is shown in dashed line in FIG. 4, but it should be understood that the contact area may be shaped or otherwise arranged in other ways. A center area of the lid 11 is unobscured by the stabilizer 7, and can be imaged by the camera 6. The portion of the arm 71 that contacts the pod may cause the pod to align with the contacting surface of the arm 71, e.g., may cause the pod to tilt or move in forward/back directions, side-to-side directions, or in other ways.

Figure 5:
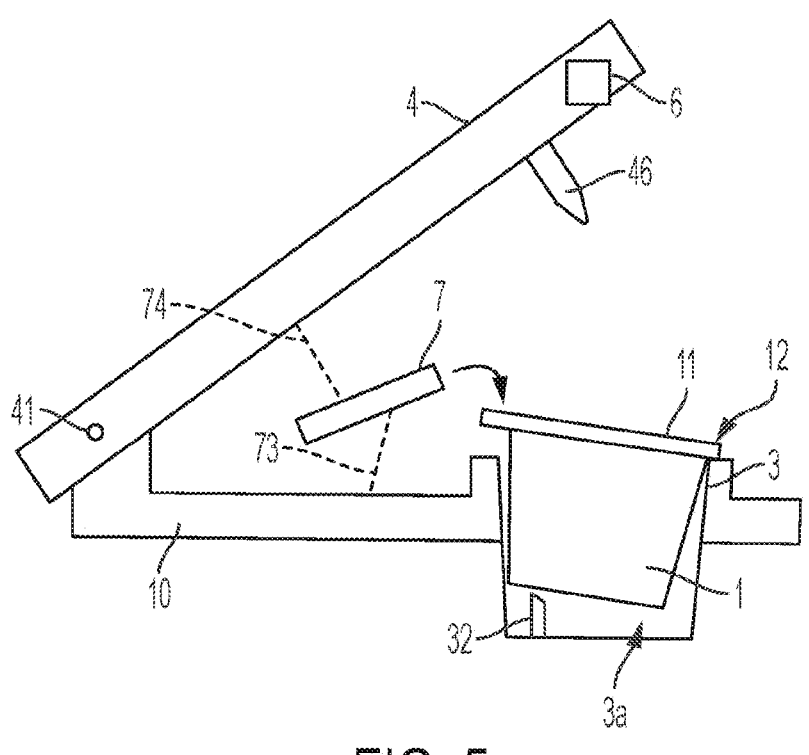
FIG. 5 is a schematic diagram of a pod stabilizer in another illustrative embodiment.
Figure 6:
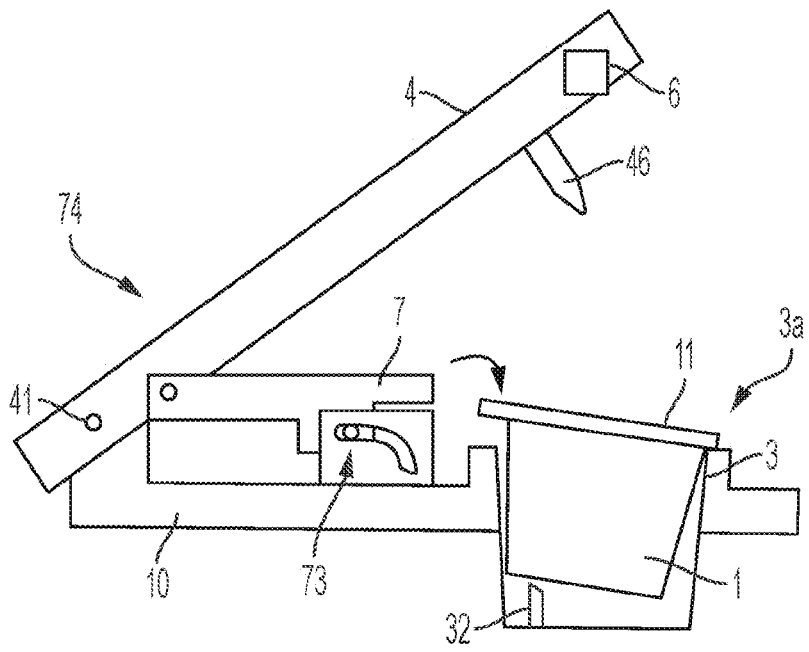
FIG. 6 is a schematic diagram of a pod stabilizer having a linkage connection to the cover and pod receiver in an illustrative embodiment.

In the FIG. 3 embodiment, movement of the stabilizer 7 is driven by movement of the cover 4, but the stabilizer 7 may be moved in other ways. For example, movement of the stabilizer 7 may be driven by movement of the handle 5 (e.g., via a linkage between the handle 5 and the stabilizer 7), by a motor that is actuated when the brew chamber begins movement toward the closed position, or other components. For example, the stabilizer 7 may be coupled by a linkage to the handle 5, cover 4 and/or receiver 3 so that when the handle 5/cover 4/receiver 3 moves, the stabilizer 7 is driven to move as desired into contact with the pod. Thus, the stabilizer 7 may be movable relative to both the cover 4 and/or receiver 3, as well as other parts of the machine, e.g., to allow the stabilizer 7 to properly position the pod. FIG. 5 shows an illustrative embodiment that is similar to FIG. 3, but differs in that the stabilizer 7 is coupled by a first linkage 73 to the receiver 3 or housing 10, and by a second linkage 74 to the cover 4. The first and second linkages 73, 74 may cooperate to move the stabilizer 7 in a desired way based on relative movement of the cover 4 and receiver 3. For example, as shown by the arrow in FIG. 5, the stabilizer 7 may move along a path in which the stabilizer initially moves upwardly and forwardly toward the pod 1 and then moves downwardly into contact with the pod. Those of skill will appreciate that the linkages or other coupling arrangements may be arranged in any suitable way. FIG. 6 shows an example arrangement for the first and second linkages 73, 74. The first linkage 73 in FIG. 6 includes a cam slot fixed relative to the receiver 3/housing 10 and a cam follower that is fixed relative to the stabilizer 7. The second linkage includes a link that is fixed to the stabilizer 7 (e.g., including an arm 71 as in FIG. 3) and is pivotally connected to the cover 4. As the cover 4 is moved toward the closed position, the second linkage 74 moves the stabilizer 7 forward toward the pod. This forward movement of the stabilizer 7 causes the cam follower of the first linkage 73 to move forwardly and downwardly in the cam slot. This causes the stabilizer 7 to move as shown by the arrow in FIG. 6, e.g., initially forwardly toward the pod and then downwardly into contact with the pod. As in the embodiments above, the stabilizer 7 may urge the pod 1 into the receiver 3, which may cause the pod to be fully seated in the receiver 3, or not. If fully seated by contact with the stabilizer 7, the pod may be fully seated in the receiver 3 before the brew chamber reaches the closed position. This may cause the pod to be pierced by the outlet piercing element 32. When fully seated in the receiver, the rim 12 of the pod may contact a support of the receiver 3 at an upper edge of the recess 3*a*. The stabilizer 7 may be arranged to contact the pod with some resilience, or "give," e.g., with a spring bias so that the stabilizer 7 provides a force no greater than a threshold on the pod. This may help orient the pod and/or prevent damage to the pod.

After a pod 1 is placed in the brew chamber 15, a user can interact with the beverage machine 100 to form a beverage. In this embodiment, the beverage machine 100 includes a user interface 14 that can display information to, and receive commands or other information from, a user (e.g., via light display, button illumination color or pattern, an alphanumeric text or graphics display, touch screen, etc.). After reading a machine readable feature on the pod 1, the machine 100 may present relevant options or other information to the user, such as a suggested volume of beverage to be made using the pod 1, a type of beverage to be made using the pod 1, and so on. The user may adjust or otherwise change the suggested brew options, or allow the machine 100 to form a beverage as suggested. In this illustrative embodiment, the user interface 14 includes four buttons that a user can press to select a beverage volume, 12 oz. button 141, 10 oz. button 142, 8 oz. button 143, and 6 oz. button 144. If the machine 10 suggests a particular beverage volume, and a user wishes to change the volume setting, the user may press one of the buttons 141-144. Also, other user interface devices than buttons, such as a touch screen display, may be employed by the user interface 14 to receive user input on beverage volume or any other parameter. For example, the user interface 14 may include "+" and "−" buttons by which a user can increase or decrease a displayed beverage volume, thereby setting the volume to be dispensed. In other embodiments, the user interface 14 may be provided on a remote device, such as a user's smartphone or other computing device, and the user may interact with the user interface 14 to provide input to the controller.) Normally, if a user presses one of the volume buttons 141-144 and instructs or allows the beverage machine 100 to dispense a beverage, the volume of the dispensed beverage will be equal to the volume selected by one of the buttons 141-144.

After selecting a desired beverage volume by pressing one of the buttons 141-144, the user may have to press another button, such as a "start" button 145, to cause the beverage machine to start the beverage dispensing process (or brew cycle). For example, after one of the buttons 141-144 is pressed to select a beverage volume, the button 145 may flash indicating that the user must press the button 145 to start the automated dispensing operation. Alternately, the beverage machine may start beverage production in response to a user pressing a volume selection 141-144. It is again stressed that this description regarding volume selection is just one example, and a user may be provided with the ability to adjust other brew parameters, such as temperature, brew strength, liquid pressure, flow rate, etc. that are determined and suggested based on reading a characteristic of the pod using the sensor 6. For example, a button 146 may allow a user to select a desired liquid flow rate for use in forming the beverage.

Exactly how the beverage machine 100 adjusts operation to effect the adjusted beverage volume and/or flow rate provided during the automated dispensing operation may depend on the liquid precursor supply components (such as pumps, flow meters, etc.) that the beverage machine 100 includes, as well as other conditions. For example, if the beverage machine 100 employs a pump and flow meter to detect an amount of precursor liquid delivered by the pump to the brew chamber 15, the beverage machine 100 may simply change the flow meter-detected volume at which the pump is shut down to stop liquid delivery so as to cause dispensing of a suitable beverage volume. If the beverage machine 100 operates by filling a hot water tank to a selected beverage volume and then delivering the volume to the brew chamber 15, the beverage machine 100 may add more liquid to the tank (in the case of an increase in selected beverage volume) or remove liquid from the tank or deliver less of the liquid in the tank (in the case of a decrease in selected beverage volume). In other embodiments, the beverage machine 100 may include an outlet valve that can stop dispensing to a user's cup when an appropriate volume of beverage has been dispensed for an iced beverage selection. In cases where additional beverage is produced, but not desired based on the user's iced beverage selection during dispensing, the outlet valve may divert additional unwanted beverage to a drip tray or waste tank rather than delivering the beverage to the user's cup. Other details regarding system control for different embodiments are provided below.

Figure 7:
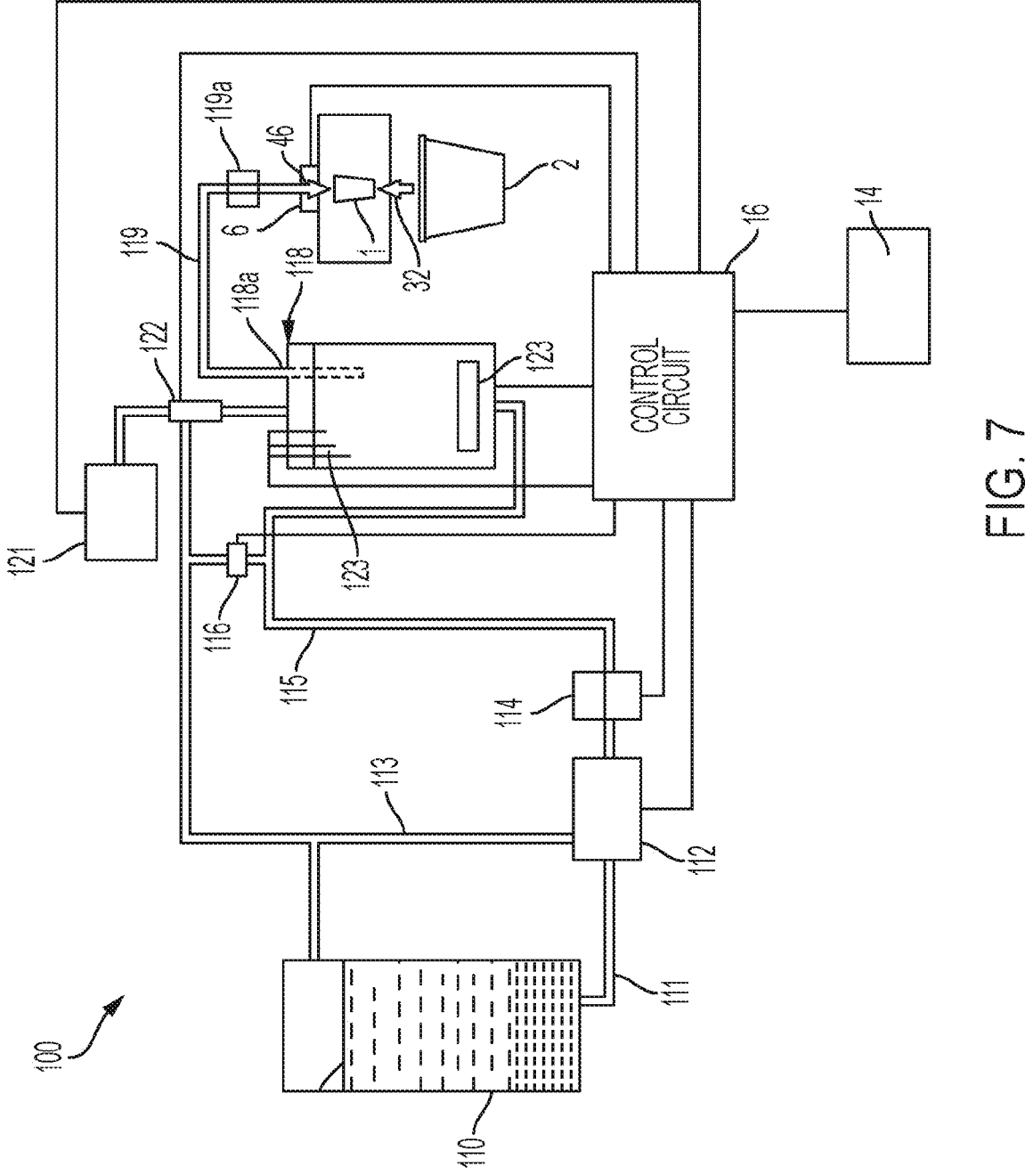
FIG. 7 shows a schematic diagram of functional components of the beverage forming system in an illustrative embodiment.

FIG. 7 shows a schematic block diagram of various components that may be included in a beverage machine 100 in one illustrative embodiment. Those of skill in the art will appreciate that a beverage machine 100 may be configured in a variety of different ways, and thus aspects of the invention should not be narrowly interpreted as relating only to one type of beverage forming apparatus. Water or other liquid may be provided to a pod 1 in a brew chamber 15 (in FIGS. 1 and 2 including the pod receiver 3 and cover 4) or to another beverage outlet by a liquid supply that, in this embodiment includes a storage tank 110, a supply conduit 111 fluidly connecting the storage tank 110 to an inlet of a pump 112 (such as a centrifugal pump, piston pump, solenoid pump, diaphragm pump, etc.), and a pump conduit 115 that is fluidly connected between the outlet of the pump 112 and a liquid inlet of the heater tank 118. This embodiment includes other optional features, such as a check valve 114 or other flow controller (such as an electronically-controlled valve) that can prevent backflow in the pump conduit 115 from the tank 118 to the pump 112 or stop flow from the pump 112 to the tank 118, an optional pump conduit vent 116, which may include a controllable valve or fixed orifice, that allows a siphon in the pump conduit 115 to be broken as necessary, or a pressure relief valve that may open to vent the pump conduit 115 in the case of pressure over a threshold level. A priming conduit 113 may be fluidly connected to the pump 112 to allow the pump 112 to be primed by venting the pump 112, if needed. In other arrangements, the conduit 113 may provide air to the pump 112 to allow the pump 112 to pump air through the conduit 115 and to the heater tank 118, e.g., to purge the conduit 115, heater tank 118 and/or other conduits downstream of the heater tank 118. In such a case, the conduit 113 may include a valve that can be opened to permit air flow to the pump 112, and/or a valve to control water flow from the storage tank 110.

Operation of the water pump 112 and other components of the apparatus 100 may be controlled by a control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces (such as a user interface 14), communication buses or other links, a display, switches, relays, triacs, or other components necessary to perform desired input/output or other functions. The control circuit 16 may include suitable circuitry to control operation of the sensor 6 and detect characteristics of a machine readable feature on the pod 1. As discussed above, the user interface 14 may be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

The heater tank 118 may be provided with a desired amount of liquid by any suitable technique, such as running the pump 112 for a predetermined time, detecting a flow rate or volume of liquid passing through the pump conduit 115 (e.g., at the flow controller 114 which may include a flow meter), operating the pump 112 for a desired number of cycles (such as where the pump is arranged to deliver a known volume of liquid for each cycle, such as for each revolution of a pump shaft), or using any other viable technique. Alternately, the heater tank 118 may be a flow through heater that heats water as it moves through the tank 118. At an initial operation or filling of the heater tank 118, the control circuit 16 may detect that the heater tank 118 is completely filled when a pressure sensor (not shown) detects a rise in pressure indicating that the water has reached the top of the heater tank 118, when a conductive probe 123 detects the presence of liquid in an upper portion of the tank 118, when an optical sensor detects a presence of liquid in the tank conduit 119, and others. Alternately, the control circuit 16 may not detect whether the tank 118 is filled or not, and simply assume that the tank 118 is filled once a first fill operation is completed, e.g., by operating the pump 112 for a time or number of cycles that is known to fill the tank 118.

Water in the tank 118 may be heated by way of a heating element 123 whose operation is controlled by the control circuit 16 using input from a temperature sensor or other suitable input. Water in the heater tank 118 may be dispensed via the heater tank conduit 119 to the brew chamber 15 or other beverage forming station or outlet. Liquid may be discharged from the heater tank 118 by the pump 112 operating to force additional unheated liquid into the tank 118, thereby displacing water out of the tank 118 and to the brew chamber 15. A flow sensor or other suitable device may be used to determine the amount of liquid delivered to the tank 118, and thus the amount of liquid delivered to the brew chamber 15. Alternately, the pump 112 may be a piston-type, diaphragm-type or other pump arranged such that a known volume of liquid may be delivered from the pump 112 to the tank 118, thus causing the same known volume to be delivered to the brew chamber 15. Thus, a specified volume of liquid may be delivered to the brew chamber 15 by operating the pump 112 to deliver the specified volume of liquid to the tank 118, e.g., a diaphragm pump may deliver 5 ml for each pump stroke, and thus 100 ml of liquid may be delivered to the tank 118 by operating the pump through 20 pump cycles (e.g., pump strokes or revolutions of a pump shaft). Liquid may be introduced into the pod 1 at any suitable pressure, e.g., 1-2 psi or higher, and the pressure may be adjustable by the control circuit 16. Although in this embodiment the tank conduit 119 is shown as connected simply to the top of the tank 118 at an outlet of the tank 118 without extending into the tank at all, the conduit 119 could be arranged in other suitable ways. The outlet of the heater tank 118 could be arranged at an extreme top of the tank 118, or in other ways in other embodiments, e.g., at the top of the tank 118 but below the extreme top portion of the tank 118, or at a location between the top and bottom of the tank 118 such as where the air pump 121 is used to move water from the tank 118 to the brew chamber 15 like that shown in FIG. 1 of U.S. Pat. No. 7,398,726. The tank conduit 119 may include a check valve 119a, solenoid valve or other flow controller, e.g., to help prevent backflow in the tank conduit 119 from the brew chamber 15 to the tank 118 and/or to prevent flow from the tank 118 to the brew chamber 15.

The brew chamber 15 may include any beverage making ingredient or material, such as ground coffee, tea, a flavored drink mix, or other beverage medium, e.g., contained in a pod 1 or not. Alternately, the brew chamber 15 may function simply as an outlet for heated water, e.g., where a beverage medium is contained in a user's cup 2. Once liquid delivery by the pump 112 to the tank 118 is complete, an air pump 121 may be operated to force air into the top of the tank 118 and/or into the conduit 119 to purge a top portion of the tank 118, the conduit 119 and/or pod 1 of liquid, at least to some extent. A valve 122 may be used to control air flow into and/or out of the tank 118.

While in this illustrative embodiment, a liquid supply system arranged to provide liquid to a beverage outlet (at the brew chamber 15) may include a pump 112, storage tank 110 and other components, these components are not necessarily required and/or other components may be included. For example, a check valve 114, flow meter, vent valve 116 (e.g., to help prevent the formation of a siphon), etc., may or may not be included with the liquid supply. Alternately, other mechanisms for providing liquid may be used, such as by gravity flow of liquid, flow forced by air pressure, or other motive force to move liquid from a storage tank 110, flow of liquid from a plumbed or other "city water" supply, and others.

For those systems employing a pod 1, once a cartridge is located in the brew chamber 15 in the closed position, the beverage machine 100 may use the pod 1 to form a beverage. For example, one or more inlet needles or other probes 46 associated with the cover 4 or other part of the machine 100 may pierce the pod 1 (e.g., a lid of the cartridge) so as to inject heated water or other liquid into the pod 1. The injected liquid may form the desired beverage or a beverage precursor by mixing with beverage material in the pod 1. The cover 4, pod receiver 3 or other portion of the machine 100 may also include one or more outlet needles 32 or other elements to puncture or pierce the pod 1 at an outlet side to permit the formed beverage to exit the pod 1. Other inlet/outlet piercing arrangements are possible, such as multiple needles, a shower head, a non-hollow needle, a cone, a pyramid, a knife, a blade, etc. In another arrangement, a beverage machine may include a piercing element (such as a spike) that forms an opening and thereafter a second inlet element (such as a tube) may pass through the formed hole to introduce liquid into (or conduct liquid out of) the container. In other embodiments, a lid or other portion of a cartridge may be pierced, or otherwise effectively opened for flow, by introducing pressure at an exterior of the lid. For example, a water inlet may be pressed and sealed to the lid exterior and water pressure introduced at the site. The water pressure may cause the lid to be pierced or otherwise opened to allow flow into the pod 1. In another arrangement, the cartridge lid may include a valve, conduit or other structure that opens when exposed to a suitable pressure and/or when mated with a water inlet tube or other structure. As with the inlet piercing arrangement, the outlet piercing arrangement may be varied in any suitable way. Thus, the outlet piercing element 32 may include one or more hollow or solid needles, knives, blades, tubes, and so on. Alternately, the pod 1 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element 32 remains in place to receive beverage as it exits the opening formed in the cartridge. However, in other embodiments, the piercing element 32 may withdraw after forming an opening, allowing beverage to exit the opening and be received without the piercing element 32 being extended into the pod 1. Other arrangements for a beverage outlet are possible however, e.g., the cartridge may have a permeable portion that allows beverage to exit pod 1. Also, there is no requirement that an inlet and/or an outlet pierce a cartridge to provide liquid to, or receive beverage from, a cartridge. Instead, communication with a cartridge may be performed using any suitable ports or other features.

With a beverage pod 1 provided in the brew chamber 15 or beverage material (if used) otherwise provided with the brew chamber 15, the control circuit 16 may operate in different ways to dispense a beverage. In some embodiments, the control circuit 16 may automatically select one or more brew parameters for automatically controlling the liquid supply and liquid conditioner portions to dispense a beverage during a dispensing operation. For example, based on characteristics read from a machine readable feature on the pod 1 by the sensor 6, the control circuit 16 may select default values for parameters such as a beverage volume, beverage temperature, whether beverage frothing or whipping will be employed, a beverage dispense time or speed, a precursor liquid flow rate, a precursor liquid pressure, whether beverage chilling will be employed, whether brew chamber air or steam purge will be employed, whether beverage material pre-wet or pulse-type brewing will be employed and if so time periods between liquid delivery, and others. Such parameters may be automatically determined in different ways, such as by receiving input from a user via a user interface 14, by employing default values stored in a memory of the control circuit 16, and/or by a combination of such techniques or others. In some cases, the control circuit 16 may begin a dispensing operation once the brew parameter values are set, or in response to additional user input such as the user pressing a brew start button, e.g., the button 145 in FIG. 2. In one example, a user may press one of the beverage volume buttons 141-144 in FIG. 2 to select a beverage volume, and then press a brew start button 145 to cause the control circuit 16 to start an automated dispensing operation to dispense a beverage.

The control circuit 16 may execute an automated dispensing operation (in this example in response to depression of the start button 145) in different ways since dispensing processes may include different steps which may be performed in series and/or in parallel. For example, in some embodiments the heater tank 118 may store a volume of pre-heated water such that the control circuit 16 may immediately control the pump 112 to deliver additional water to the tank 118, thereby causing the flow of heated water from the tank 118 to the brew chamber 15 at the start of a dispensing operation. In other embodiments, water in the heater tank 118 may first need to be heated, and thus the control circuit 16 may first cause the heating element 123 to heat water in the tank 118, and then automatically start water delivery once heating is complete. Of course, these steps are relevant to the illustrative embodiment in FIGS. 1-2, and other beverage machine 100 configurations may involve other steps at part of an automated dispensing operation. For example, if the beverage machine 100 employs an inline or flow through heater as a heater tank 118, the control circuit 16 may cause a heating element of the inline heater to begin heating and then simultaneously or shortly thereafter begin causing water flow through the inline heater and to the brew chamber. Where no pump is used by the beverage machine 100, water flow may be caused by gravity, steam pressure in an inline heater, or other.

With water or other liquid sufficiently heated in the heater tank 118, the control circuit 16 may continue with the automated process of beverage dispensing by causing the pump 112 to deliver liquid to the tank 118, thereby delivering heated liquid to the brew chamber 15. The control circuit 16 may sense or otherwise keep track of a volume of liquid delivered to the brew chamber 15 so that the appropriate beverage volume can be dispensed. For example, the control circuit 16 may cause the pump 112 to operate a specified number of cycles where a particular volume of liquid is delivered by the pump 112 for each pump cycle. Alternately, a flow meter may be used by the control circuit 16 to detect a volume of liquid delivered to the brew chamber 15, or other techniques.

It should be understood that other user input provided via a user interface 14 to adjust other parameters may cause similar adjustment in system control by the control circuit 16 during an automated dispensing operation. If a user presses a button or otherwise provides an increase temperature parameter for the beverage, the control circuit 16 may cause a heating element to operate so as to increase the beverage temperature accordingly. If a user presses a "whipping" button during dispensing, the control system may cause a whipper element to froth or foam a beverage dispensed whereas the whipper element would not have otherwise been used. Other adjustments to system operation under automated control by the control circuit 16 during a dispensing operation may be made in response to user adjusted brew parameters.

As used herein, "beverage" refers to a liquid substance intended for drinking that is formed when a liquid interacts with a beverage material, or a liquid that is dispensed without interacting with a beverage material. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage machine comprising:
a liquid supply arranged to provide a liquid for forming a beverage;
a brew chamber movable between open and closed positions and arranged to hold a pod containing beverage material for mixing with the liquid to form a beverage, the brew chamber including a camera arranged to image a portion of a lid of the pod as the brew chamber is moved toward the closed position, and the brew chamber further including a pod stabilizer configured to move relative to the pod to contact and hold the pod during imaging by the camera as the brew chamber is moved towards the closed position;
a liquid conditioner arranged to heat or cool the liquid that is provided to the brew chamber; and
a housing arranged to support at least portions of the liquid supply, brew chamber and liquid conditioner.

2. The machine of claim 1, wherein the brew chamber is adapted to receive the pod having a cup-shaped container and the lid is secured to an opening of the cup-shaped container.

3. The machine of claim 2, wherein the lid is flat.

4. The machine of claim 2, wherein the brew chamber includes a receiver having a recess to receive the cup-shaped container and a cover, the receiver and cover being movable relative to each other between the open and closed positions such that in the open position the receiver is exposed to receive the pod and in the closed position the cover and the receiver at least partially enclose the pod.

5. The machine of claim 4, wherein the camera is mounted to and movable with the cover.

6. The machine of claim 4, wherein the pod stabilizer is arranged to contact a part of the lid and urge the pod into the recess of the receiver as the receiver and cover are moved toward the closed position.

7. The machine of claim 6, wherein the pod stabilizer is arranged to contact the lid only at a rear side of the receiver and the camera is arranged to image at least a center area of the lid.

8. The machine of claim 4, wherein the pod stabilizer is arranged to push the pod into the recess as the receiver and cover are moved toward the closed position such that the pod is fully seated in the receiver prior to the receiver and cover reaching the closed position.

9. The machine of claim 8, wherein the camera is arranged to image the pod after the pod is fully seated in the receiver and before the receiver and cover reach the closed position.

10. The machine of claim 1, wherein the pod stabilizer is adapted to fully seat the pod in the brew chamber as the brew chamber moves toward the closed position.

11. The machine of claim 10, wherein the brew chamber includes a receiver and the pod stabilizer is adapted to push the pod fully into the receiver before the brew chamber reaches the closed position.

12. The machine of claim 11, wherein pod stabilizer is adapted to contact the pod at a rim to push the pod into the receiver.

13. The machine of claim 11, wherein the brew chamber includes a cover, the cover and receiver being movable relative to each other between the open and closed positions, the camera being mounted to the cover.

14. The machine of claim 13, wherein the pod stabilizer is movable relative to the receiver and the cover.

15. The machine of claim 1, wherein the brew chamber includes a receiver to receive the pod and a cover, the receiver and cover being movable relative to each other between the open and closed positions such that in the open position the receiver is exposed to receive the pod and in the closed position the cover and the receiver at least partially enclose the pod, wherein the pod stabilizer is movable relative to the receiver and the cover.

16. The machine of claim 15, wherein movement of the receiver and cover relative to each other causes movement of the pod stabilizer.

17. The machine of claim 16, wherein pod stabilizer moves based on movement of the cover.

18. A method of operating a beverage machine adapted to use a pod to form a beverage, comprising:

receiving the pod in a brew chamber with the brew chamber in an open position;

moving the brew chamber toward a closed position in which the pod is at least partially enclosed and used to form a beverage;

moving a pod stabilizer relative to the pod to contact a lid of the pod and hold the pod in a position suitable for imaging the lid of the pod as the brew chamber moves toward the closed position; and imaging the lid of the pod as the brew chamber moves toward the closed position and while the pod is held in the position suitable for imaging by the pod stabilizer.

19. The method of claim 18, wherein the step of contacting the lid includes urging the pod into a recess of a receiver of the brew chamber.

20. The method of claim 18, wherein the step of moving the brew chamber includes moving a cover and a receiver of the brew chamber relative to each toward the closed position such that the cover is positioned over a recess of the receiver adapted to receive the pod, and wherein the step of imaging includes imaging the lid using a camera mounted to the cover.

\* \* \* \* \*